United States Patent [19]

Wang

[11] Patent Number: 4,978,736

[45] Date of Patent: Dec. 18, 1990

[54] POLYAMIDEIMIDE POLYMERS

[75] Inventor: Pen-Chung Wang, Houston, Tex.

[73] Assignee: Shell Oil Company, Houston, Tex.

[21] Appl. No.: 459,920

[22] Filed: Jan. 2, 1990

Related U.S. Application Data

[63] Continuation-in-part of Ser. No. 279,610, Dec. 5, 1988, abandoned.

[51] Int. Cl.$^5$ .................. C08G 8/02; C08G 2/00; C08G 73/10; C08G 69/26
[52] U.S. Cl. .................. 528/220; 528/125; 528/128; 528/229; 528/322; 528/324; 528/353
[58] Field of Search ............ 528/125, 220, 229, 128, 528/322, 324, 353

[56] References Cited

U.S. PATENT DOCUMENTS

| | | | |
|---|---|---|---|
| 3,778,411 | 12/1973 | Emerick et al. | 528/176 |
| 4,314,047 | 2/1982 | Banucci et al. | 528/26 |
| 4,330,666 | 5/1982 | White et al. | 528/207 |
| 4,362,863 | 12/1982 | Kojima et al. | 528/353 |
| 4,398,021 | 8/1983 | St. Clair et al. | 528/222 |
| 4,489,027 | 12/1984 | St. Clair et al. | 264/137 |

OTHER PUBLICATIONS

Kurita et al., *J. Polymer Sci.: Polymer Chem. Ed.*, vol. 17, pp. 779–789 (1978).
Yang et al., *J. Polymer Sci.: Polymer Chem. Ed.*, vol. 17, pp. 3255–3271 (1970).

*Primary Examiner*—Harold D. Anderson
*Assistant Examiner*—T. M. Mosley

[57] ABSTRACT

Novel poly(amideimide) polymers and a method for the production thereof, which polymers are characterized by moieties of a 1,6-diaza [4.4] spirodilactam and of a bis(maleimide) alternating with the non-amino portion of a primary diamine wherein the amino groups are not located upon adjacent carbon atoms. The polymers are thermoplastic polymers of relatively high glass transition temperature.

35 Claims, No Drawings

POLYAMIDEIMIDE POLYMERS

CROSS-REFERENCE TO RELATED APPLICATION

This application is a continuation-in-part of Ser. No. 279,610, filed Dec. 5, 1988.

FIELD OF THE INVENTION

This invention relates to a novel class of thermoplastic poly(amideimide) polymers. More particularly, the invention relates to novel polymers containing amide moieties of a 1,6-diaza [4.4] spirodilactam or imide moieties of a bis(imide) alternating with the non-amino portion of a primary diamine.

BACKGROUND OF THE INVENTION

The class of polyimide polymers is known in the art, incorporating a variety of connecting structures around a central bis(imide) portion. A bismethylolimide is reacted with a dinitrile to produce a polyimide by Kurita et al, J. Polymer Sci.: Polymer Chem. Ed., Vol. 16, pp. 779-789 (1978). Yang et al, J. Polymer Sci.: Polymer Chem. Ed., Vol. 17, pp. 3255-3271 (1979) produce a polyimide by reaction of a diamine with N,N'-(pyromellitoyl)diacetyl chloride. A poly(imidesulfone) is produced by the process disclosed by St. Clair et al, U.S. Pat. No. 4,489,027 and U.S. Pat. No. 4,398,021. Reaction of diacids and polyamines to produce open-chain poly(amideimides) is disclosed by Emerick, U.S. Pat. No. 3,778,411. Polyetherimide polymers are produced by White et al, U.S. Pat. No. 4,330,666, by use of a hydroxypyridine or an aminocarboxylic acid as catalyst. Similar polyetherimide polymers are disclosed by Banucci et al, U.S. Pat. No. 4,314,047. Aliphatic polyimide polymer is produced from a diamine and an aliphatic tetracarboxylic acid by Kojima et al, U.S. Pat. No. 4,362,863.

The class of polyimide polymers broadly is a class of thermoplastic polymers and certain of the polyimide polymers are easily processed by conventional methods used for the processing of other thermoplastics. Other polyimides, however, are processed only with difficulty. Certain of the polyimides are characterized by good mechanical properties including flexibility but others are deficient in such properties. Some polyimide polymers offer good solvent resistance to common solvents likely to be encountered whereas other polyimide polymers tend to be at least partially soluble in such solvents as chloroform, cresol or hydrocarbon solvents. It would be of advantage to provide a class of poly(amideimide) polymers which provide good processability as well as satisfactory solvent resistance.

SUMMARY OF THE INVENTION

This invention relates to a novel class of linear, alternating poly(amideimide) polymers having amide as well as imide functionality. More particularly, the invention relates to a process of producing such a novel class of polymers, characterized by alternating moieties of a 1,6-diaza [4.4] spirodilactam, providing amide functionality, and of a bis(maleimide), which provides imide functionality, with a moiety derived from a primary diamine.

DESCRIPTION OF THE INVENTION

The process for the production of the poly(amideimide) polymers of the invention comprises the reaction of a primary diamine, an aliphatic or aromatic tetracarboxylic acid or a mono- or di-anhydride thereof, and a spirodilactam precursor. The spirodilactam precursor is a ketodicarboxylic acid compound or a 1,6-dioxaspiro[4.4]nonane-2,7-dione compound which will react with the primary diamine to produce [4.4] spirodilactam groups having spiro ring nitrogen atoms in the 1- and 6- positions of the spirodilactam structure.

In one embodiment of the spirodilactam precursor, the precursor is a ketodiacid of up to 30 carbon atoms inclusive having two carbon atoms between the keto group and each carboxy function In other terms, the ketodiacid compound is a 4-oxoheptanedioic acid compound. Although a variety of such ketoacid compounds having a variety of substituents in addition to the oxo moiety and the carboxy functions, the preferred 4-oxoheptanedioic acid compounds are represented by the formula

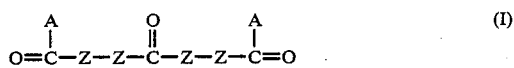

wherein A independently is hydroxy, alkoxy, preferably lower alkoxy of up to 4 carbon atoms inclusive, or halo, preferably the middle halogens chloro or bromo, and Z independently is $>C(Z')_2$ in which Z' independently is hydrogen, lower alkyl, e.g., of 1 to 4 carbon atoms, preferably methyl, halo, preferably the lower halogens, fluoro or chloro, or aryl, preferably phenyl, or Z is such that two adjacent Z moieties taken together form a ring system of Z" of from 5 to 7 ring atoms inclusive, up to two of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups. When the Z moieties are linked together to form a ring system the ring system is aromatic, cycloaliphatic or heterocyclic and is hydrocarbyl containing only atoms of carbon and hydrogen besides any heteroatoms or substituted hydrocarbon containing additional atoms such as halogen, preferably middle halogen, in the form of inert carbon atom substituents.

In one embodiment employing the ketodiacid compound spirodilactam precursor, each Z moiety is $>C(Z')_2$ and the ketodiacid compound is an 4-oxoheptanedioic acid compound. In one such embodiment, largely because of a particularly convenient method of producing the spirodilactam precursor, a preferred 4-oxoheptanedioic acid compound has at least one hydrogen on the carbon atom adjacent to each carboxy function, that is, at least one Z' on each carbon atom adjacent to a carboxy function is hydrogen. Such 4-oxoheptanedioic acid compounds are represented by the formula

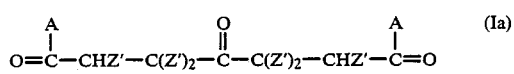

wherein Z' and A have the previously stated meanings Such 4-oxoheptanedioic acid compounds include 4-oxoheptanedioic acid, dimethyl 4-oxoheptanedioate, 2,6-dimethylheptanedioic acid, 2,3,5,6-tetramethyl-4-oxoheptanedioyl chloride, di-n-propyl 2,6-di-n-butyl-4-heptanedioate and 7-carbomethoxy-3,3,5,5-tetramethyl-4-oxohexanedioic acid. The preferred ketodiacids of the above formula Ia are those wherein each Z' is hydrogen or methyl, especially hydrogen, and each A is hydroxy or methoxy, especially hydroxy.

These ketodiacid compounds are known compounds or are produced by known methods, but the esters of formula Ia, i.e., the compounds wherein A is alkoxy, are produced by reaction of formaldehyde with an α,β-ethylenically unsaturated carboxylic acid ester such as methyl acrylate, ethyl methacrylate, methyl crotonate, methyl ethacrylate and propyl 2,3-dimethylbutanoate. This reaction is conducted in the presence of a catalyst system which comprises a thiazolium salt and a tertiary amine and produces the dialkyl 4-oxoheptanedioate derivative in good yield. This process is described in greater detail in copending U.S. application Ser. No. 171,999, filed Mar. 23, 1988, now U.S. Pat. No. 4,800,231, incorporated herein by reference. Conversion of the esters thereby obtained to free acids or acid halides is by conventional methods as is the general interconversion of the acids, esters or acid halides of formula Ia.

In a second embodiment of the ketodiacid compound spirodilactam precursor, the 4-ketodiacid incorporates cyclic moieties between the keto group and the carboxy functions, i.e., two adjacent Z moieties form a fused cyclic ring structure Z''. Such diacid compounds are represented by the formula

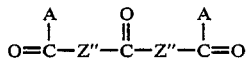 (Ib)

wherein A and Z'' have the previously stated meanings Illustrative of these cyclic ketodiacid compounds are di(2-carboxycyclohexyl) ketone, di(2-carboxyphenyl) ketone, di(2-carbopropoxycyclo-4-pentenyl) ketone, di(2-chlorocarbonylphenyl) ketone, di(2-carboxypyridyl) ketone, 2-carboxyphenyl N-methyl-3-carboxy-2-pyrryl ketone, di(3-carbethoxy-2-morpholyl) ketone and di(3-carbomethoxy-2-naphthyl) ketone. The preferred cyclic ketodiacid compounds of formula Ib are those wherein each Z'' is a ring system of from 5 to 6 carbon atoms inclusive and up to one nitrogen atom, particularly benzo.

Such ketodiacids are known compounds or are produced by known methods, such as the method of U.S. Pat. No. 1,999,181 or the method of Cava et al, J. Am. Chem. Soc., 20, 6022 (1955).

In yet another modification of the diketone compound spirodilactam precursor, the ketodiacid incorporates one fused cyclic moiety with the remainder of the Z moieties being >C(Z')$_2$, i.e., the compounds are of the formula

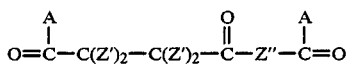 (Ic)

wherein A, Z' and Z'' have the previously stated meanings Such ketodiacids of one cyclic moiety are illustrated by 3-(2-carboxybenzoyl)propionic acid, 3-(2-carbomethoxy-2-pyridyloyl)-2-ethylpropionic acid, ethyl 3-(2-carbethoxybenzoyl)propionate and 3-(2-carboxy-4-methylbenzoyl)butyryl chloride. The ketodiacids of the above formula Ic are known compounds or are produced by known methods. For example, 2-carboxymethylbenzaldehyde reacts with methyl acrylate according to the general teachings of copending U.S. patent application Ser. No. 171,999, filed Mar. 23, 1988, to produce methyl 3-(2-carbomethoxybenzoyl)propionate.

In a second modification of the invention, the spirodilactam precursor is a 1,6-dioxaspiro[4.4]nonane-2,7-dione compounds wherein the spiro ring system is substituted with hydrogen, alkyl or halogen, or which incorporates fused cyclic substituents which include the 3- and 4- spiro ring positions and/or the 8- and 9- spiro ring positions of the spiro ring system. One class of such [4.4] spirodilactones is represented by the formula

 (II)

wherein Z has the previously stated significance.

In the embodiment of these spirodilactone spirodilactam precursors of the above formula II wherein each Z is >C(Z')$_2$, the spirodilactone is represented by the formula

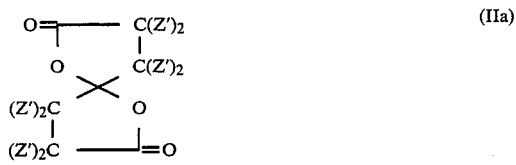 (IIa)

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro[4.4] nonane-2,7-dione, 4,9-diphenyl-1,6-diazaspiro[4.4]nonane-2,7-dione, 3,3,8,8-tetramethyl-1,6 -dioxaspiro[4.4]nonane-2,7-dione, 3,3,4,4,8,8,9,9-octamethyl-1,6-dioxaspiro[4.4]nonane-2,7-dione and 3,4,8,9-tetrafluoro-1,6-dioxaspiro[4.4]nonane-2,7-dione. The preferred spirodilactones of the above formula IIa are those wherein at least one Z' of each Z'-substituted carbon atom is hydrogen.

The compounds of formula IIa are known compounds or are produced by known methods such as the process of Pariza et al Synthetic Communications, Vol. 13(3), pp. 243–254 (1983), herein incorporated by reference.

In the embodiment of the spirodilactone spirodilactam precursors of the above formula II which incorporate a fused cyclic moiety as a part of the two rings of the spiro ring system, the spirodilactones are represented by the formula

 (IIb)

wherein Z'' has the previously stated meaning. Typical compounds of this formula IIb are 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-di(4- methylbenzo)-1,6-dioxaspiro[4.4]nonane-2,7-dione and 3,4,8,9-di(pyrido)-1,6-dioxaspiro[4.4]nonane-2,7-dione. These compounds are known compounds or are produced by known methods, for example, the process of the above Cava et al article or by the process of U.S. Pat. No. 1,999,181.

In a third embodiment of the spirodilactone spirodilactam precursor, a cyclic moiety is fused to one spiro ring and the other spiro ring is free from fused ring substituents. Such spirodilactones are represented by the formula

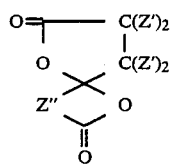
(IIc)

wherein Z' and Z'" have the previously stated meanings. Such spirodilactones are illustrated by 3-methyl-8,9-benzo-1,6-dioxaspiro[4.4]nonane-2,7-dione, 3,4-benzo-1,6-dioxaspiro[4.4]nonane-2,7-dione, and 3,3,4,4-tetramethyl-8,9-morphols-1,6-diazaspiro[4.4]nonane-2,7-dione. The spirodilactones of the above formula IIc are produced by known methods, for example, the dehydration of the corresponding ketodiacid. By way of illustration, 3,4-benzo-1,6-dioxaspiro[4.4]nonane-2,7-dione is produced by dehydration of 3-(2-carboxybenzoyl)propionic acid through application of heat.

In general, the preferred spirodilactone spirodilactam precursors are hydrocarbon except for the oxygen atoms of the lactone moieties, and particularly preferred are those spirodilactones which are free from fused ring substituents (formula IIa) or those which have a fused ring substituent on each of the spiro rings (formula IIb). An especially preferred spirodilactone spirodilactam precursor of the first class is 1,6-dioxaspiro[4.4]nonane-2,7-dione while a preferred spirodilactone of the latter class is 3,4,8,9-dibenzo-1,6-dioxaspiro[4.4]nonane-2,7-dione.

The spirodilactam precursor is reacted according to the process of the invention with a primary diamine and an aliphatic tetracarboxylic acid or a bis anhydride. By primary amine is meant an organic compound having two primary amino groups, i.e., -NH2 groups, as carbon atom substituents. While the reaction to produce polymeric polyamides will take place with a variety of primary diamines having a variety of structures, best results are obtained in the process of the invention if the two amino groups are not located on adjacent carbon atoms, that is, at least one carbon atom separates the two atoms on which the two amino groups are substituents. One such class of primary diamines comprises diamines of up to 30 carbon atoms inclusive which are represented by the formula $$H_2N-R-NH_2$$ (III)

where R is an organic radical of up to 30 carbon atoms inclusive and is aliphatic or is aromatic of from 1 to 2 aromatic rings inclusive, which, when two aromatic rings are present, incorporates said rings as fused or connected by X wherein X is a direct valence bond, or X is alkylene of up to 8 carbon atoms inclusive, oxy, thio, sulfonyl, carbonyl, dioxyphenylene, i.e.,

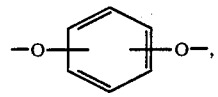

2,2-di(oxyphenyl)propane, i.e.,

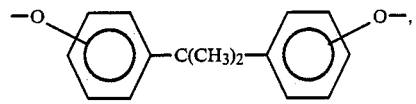

di(oxyphenyl)sulfone, i.e.,

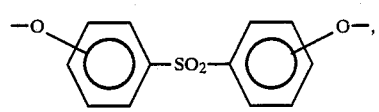

or dioxydiphenylene, i.e.,

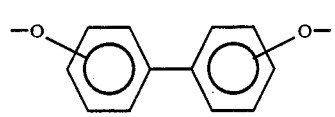

with the proviso that the two amino substituents are not located on adjacent carbon atoms. R is preferably hydrocarbyl, that is, contains only atoms of carbon and hydrogen besides the other atoms of divalent linking groups, or is substituted hydrocarbyl additionally containing other atoms as inert, monovalent substituents of carbon atoms, for example, halogen atoms, preferably middle halogens.

Illustrative of alkylene-containing diamines of the above formula III are trimethylenediamine, tetramethylenediamine, hexamethylenediamine, octamethylenediamine, 1,7-diamino-4-methyloctane, 1,4-diaminocyclohexane, di(4-aminocyclohexyl)methane, dodecamethylenediamine and 1,6-diamino-3,4-diethylhexane. Arylene diamines of the above formula III include 1,4-phenylenediamine, 2,4-toluenediamine, 4,4'-diaminobiphenyl 2,4-toluenediamine, 4,4'-diaminobiphenyl, 1,5-diaminonaphthalene, di(3-aminophenyl) ether, di(4-aminophenyl)methane, 2,2-di(3-amino-4-methylphenyl)propane, di(4-amino-2-ethylphenyl) sulfone, di(3-amino-4-chlorophenyl) ketone, di(2-aminophenyl) sulfide, 1,3-di(3-aminophenyloxy)benzene, 2,2-di(4-aminophenyloxyphenyl)propane and 4,4'-di(4-aminophenyloxy)biphenyl. The preferred primary diamines are those of the above formula III where R is divalent arylene and which are otherwise hydrocarbyl except for any additional atoms of divalent linking groups. Particularly preferred are the di(aminophenyl)alkanes, especially the di(4-aminophenyl)alkanes such as di(4-aminophenyl)methane.

The primary diamine and the spirodilactam precursor are reacted in the process of the invention with a tetracarboxylic acid compound. The tetracarboxylic acid compound is a tetracarboxylic acid or mono- or dianhydride thereof having up to 30 carbon atoms wherein each of four separate carbon atoms is substituted with a carboxy group or part of an anhydride group, i.e., part of a

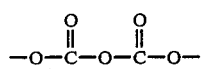

group. Each of the four carbon atoms is adjacent to another carbon atom so substituted and no carbon atom has more than one of such substituents. Whether the four carboxylic substituents of the tetracarboxylic acid compound are present as carboxyl groups or as parts of anhydride moieties is not critical so far as the process of the invention is concerned and the resulting polymer product will be the same regardless of the particular type of group or groups present A wide variety of tetracarboxylic acid compounds are useful in the process of the invention but a preferred class of such tetracarboxylic acid compounds is represented by the formula

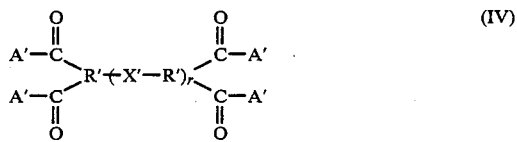

wherein R' independently is R, r is 0 or 1, A' independently is hydroxy or the two A' groups together are oxy connecting carbonyl groups attached to adjacent carbon atoms and X' is R, X, haloalkylene; substituted-X wherein the substituents are halo, preferably middle halo, or alkyl, preferably lower alkyl, e.g., of 1 to 4 carbon atoms, substituted o aromatic carbon atoms, di(carbonyl)X, i.e.,

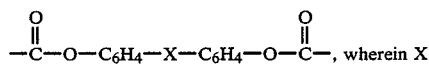

has the previously stated meaning The tetracarboxylic acid compound is therefore aliphatic or aromatic including mixed aliphatic and aromatic, is acyclic or cyclic or mixed acyclic and cyclic, and is otherwise hydrocarbyl containing only atoms of carbon and hydrogen besides the oxygens of the carboxylic functions or is non-hydrocarbyl containing additional atoms as divalent linking groups or as monovalent carbon atom substituents.

Illustrative of the tetracarboxylic acid compounds are aliphatic tetracarboxylic acid compounds such as 1,2,3,4-butanetetracarboxylic acid, 1,2,3,4-pentanetetracarboxylic acid, 1,2,4,5-cyclohexanetetracarboxylic acid, 1,2,3,4-butanetetracarboxylic acid dianhydride, 1,2,3,4-cyclobutanetetracarboxylic acid, 1,2,5,6-cycloocta-1,5-dienetetracarboxylic acid dianhydride and 2,2-di(carboxymethyl)-1,3-propanedicarboxylic acid; aromatic tetracarboxylic acid compounds such as 1,2,4,5-benzenetetracarboxylic acid, 1,2,4,5-benzenetetracarboxylic acid dianhydride, 4,5-dicarboxyphthalic anhydride, 3,3'4,4'-benzophenonetetracarboxylic acid, 2,2-bis(3,4-dicarboxyphenyl)hexafluoropropane, bis(3,4-dicarboxyphenyl) ether dianhydride, 1,2,5,6-naphthalenetetracarboxylic acid dianhydride, 2,2',3,3'-biphenyltetracarboxylic acid, 3,3',4,4'-biphenyltetracarboxylic acid dianhydride, bis(3,4-dicarboxyphenyl) thioether, bix(3,4-dicarboxyphenyl) sulfone dianhydride, 1,4-bis(3,4-dicarboxyphenyloxy)benzene, 1,3-bis(3,4-dicarboxybenzoyl)benzene dianhydride, 1,6-bis(2,3-dicarboxyphenyl)hexane, 2,2-[4(2,3-dicarboxybenzoyloxy)-3,5-dibromophenyl]propane, 4,4'-bis(2,3-dicarboxybenzoyloxy)-3,3',5,5'-tetramethylbiphenyl dianhydride and bis[4-(2,3-dicarboxybenzoyl)phenyl] sulfone.

In general, the tetracarboxylic acid compounds of the above formula IV wherein r is 0 are preferred as are tetracarboxylic acid compounds which are hydrocarbon except for the oxygens of the carboxylic functions and divalent linking groups. Aliphatic tetracarboxylic acid compounds are a preferred class of reactants in the process of the invention, particularly 1,2,3,4-butanetetracarboxylic acid.

The polymer product of the invention is a linear, alternating poly(amideimide) polymer wherein the non-amino portion of the primary diamine, i.e., a R moiety, alternates with either (1) a [4.4] spirodilactam having ring nitrogens in the 1- and 6- ring positions and connected to the adjoining polymer components through the ring nitrogen atoms, which spirodilactam comprises the residue of the spirodilactam precursor and the amino nitrogens of a portion of the primary diamine, that is, the spirodilactam moiety represented by the formula

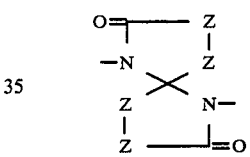

wherein Z has the previously stated meaning, or (2) a bis(maleimide) moiety which includes a residue of the tetracarboxylic acid combined with nitrogen atoms of another portion of the primary diamine, i.e., the bis(imide) moiety represented by the formula

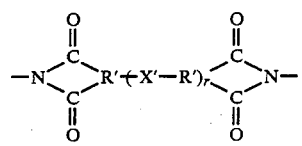

wherein R', r and X' have the previously stated meanings In terms of the preferred reactants as defined above, the poly(amideimide) polymer is represented by the repeating formula

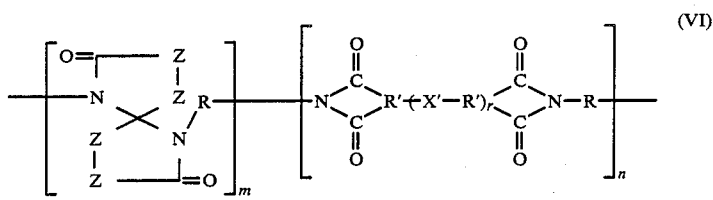

wherein Z, R, R', X', and r have the previously stated meanings t will be apparent from the formula of the polymer product that the units of the polymer which are spirodilactam moieties are also properly considered as amide groups and the units of the polymer which incorporate bis(imide) moieties are imide units. Within the polymer chain the amide groups and the imide groups are found randomly with the relative proportions of the amide units and the imide units depending in part on the relative proportion of the spirodilactam precursor and the tetracarboxylic acid provided to the reaction mixture. In the preferred poly(amideimide) products of the invention, the ratio of the randomly found polymer units as defined by m:n will typically be from about 3:1 to about 1:3 but can be as high as about 95:5 or as low as about 5:95. Such polymers will typically have a molecular weight of from about 1,000 to about 100,000, more typically from about 10,000 to about 50,000. By linear is meant that the polymer chain produced from the diamine, acid and spirodilactam precursor resembles a line that is essentially unbranched.

The nomenclature of the polymer product is not easily determined or understood, but the identity of the products will be apparent from the above formulas for the reactants and for the product. Preferred polymers are those wherein each r is 0 and R is di(phenylene)alkane, particularly di(4-phenylene)alkane such as di(4-phenylene)methane. An illustrative polymer is obtained by reaction of (1) 4-oxoheptanedioic acid or 1,6-dioxaspiro[4.4]nonane-2,7-dione with (2) a primary diamine such as di(4-aminophenyl)methane and (3) an aliphatic tetracarboxylic acid such as 1,2,3,4-butanetetracarboxylic acid.

The poly(amideimide) polymer is obtained by contacting the spirodilactam precursor, the primary diamine and the tetracarboxylic acid under polymerization conditions in the presence of a liquid-phase reaction diluent. To obtain the products of the above formula VI, the molar ratio of spirodilactam precursor to tetracarboxylic acid should be from about 95:5 to about 5:95 but preferably from about 3:1 to about 1:3. The primary diamine should be provided in a molar quantity at least about equal to the total molar quantity of spirodilactam precursor plus tetracarboxylic acid. Molar ratios of primary diamine to total other reactants from about 1:5 to about 5:1 are satisfactory with such molar ratios of from about 1:2 to about 2:1 being preferred.

The reaction diluent is a diluent which is liquid under polymerization conditions and in which the reactants are at least partially soluble at reaction temperature. Additionally, the reaction diluent should be relatively high boiling and inert to the reactants and the polymer product under reaction conditions. Suitable reaction diluents include N-alkylamides such as N+N-dimethylacetamide, N,N-dimethylformamide, and N-methyl-2-pyrrolidone, sulfur-containing diluents such as dimethyl sulfoxide and sulfolane, phenols such as phenol and m-cresol and glycols such as ethylene glycol and trimethylene glycol. The polymerization is conducted under polymerization conditions at an elevated temperature. Suitable reaction temperatures are from about 120° C. to about 250° C., preferably from about 150° C. to about 200° C. Reaction pressures are satisfactory if sufficient to maintain the reaction mixture in a liquid phase. Such pressures are often up to 20 atmospheres but more often are from about 0.8 atmospheres to about 10 atmospheres.

It is generally useful, but not required, to provide to the reaction mixture a small amount of a strong acid having a pKa lower than that of the tetracarboxylic acid. Such strong acids include inorganic acids such as hydrochloric acid, sulfuric acid, nitric acid and perchloic acid, as well as organic acids such as formic acid, trichloroacetic acid, 2,4-dinitrophenol, phthalic acid and p-toluenesulfonic acid. Nitric acid is a preferred strong acid. When a strong acid is employed, amounts of strong acid up to about 1% by weight based on total reactants are useful. Very small amounts of acid may be used and indeed no acid is required. Larger amounts of strong acid are also useful but seem to offer no advantageous effect.

The reaction is conducted by charging the reaction mixture components to a suitable reactor and maintaining reactant contact by conventional methods such as shaking, stirring or refluxing while the reaction mixture is maintained at polymerization conditions. It is advantageous to remove water present or formed during reaction by such means as selective extraction or distillation, preferably azeotropic distillation with a portion of the reaction diluent or a second reaction diluent with which water forms an azeotrope, e.g., toluene or ethylbenzene. Subsequent to reaction the polymer product is removed by conventional methods such as extraction, solvent removal or precipitation.

The poly(amideimide) polymer is a thermoplastic polymer of relatively high glass transition temperature, typically above 200° C. or even higher. The polymer is useful for the applications typically associated with thermoplastic polymers and is processed by known methods such as extrusion or injection molding into sheets, films, fibers or molded articles which demonstrate resistance to common solvents Because of the relatively high glass transition temperatures exhibited by the polymer products, they are additionally useful as engineering thermoplastics for applications where elevated temperatures are likely to be encountered. Such applications include the production of containers for food and drink, base materials for electrical and electronic applications and both external and internal parts for automotive applications.

The invention is further illustrated by the following Illustrative Embodiment which should not be construed as limiting the invention.

Illustrative Embodiment I

A mixture of 17.4 g (0.1 mole) of 4-oxoheptanedioic acid, 23.4 g (0.1 mole) of 1,2,3,4-butacetetracarboxylic acid and 39.65 g (0.2 mole) of di(4-aminophenyl)methane 200 ml of N-methyl-2-pyrrolidone, 60 ml of ethylbenzene and 2 ml of nitric acid was placed in a resin pot equipped with a mechanical stirrer and a condenser. While being stirred, the mixture was warmed to 170°-180° C. and maintained for 16 hours as water was removed by azeotropic distillation. The resulting mixture was then cooled and poured into 1 liter of methanol. The precipitated product was then dried at 100° C. for 24 hours in a vacuum oven. The poly(amideimide) polymer had a glass transition temperature of 270° C. and the nuclear magnetic resonance spectra were consistent with the repeating structure

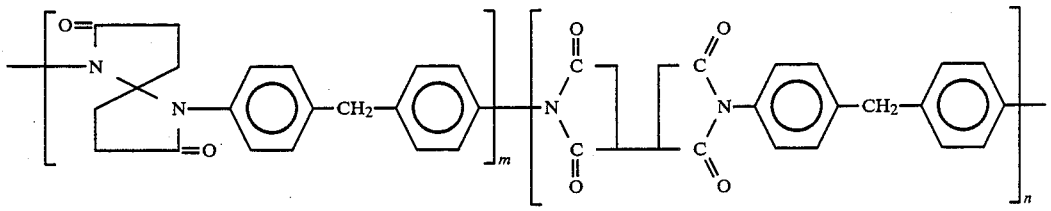

Illustrative Embodiment II

When a polymer is produced by the process of Illustrative Embodiment I but substituting 3,4,8,9-dibenzo-1,6-dioxaspiro[4.4]nonane-2,7-dione for the oxoheptanedioic acid and 1,2,4,5-benzenetetracarboxylic acid dianhydride for the butanetetracarboxylic acid, the resulting poly(amideimide) polymer will have a relatively high glass transition temperature.

What is claimed is:

1. A process of producing a linear alternating poly(amideimide) polymer by contacting under polymerization conditions in a liquid phase reaction diluent
   (1) a spirodilactam precursor of up to 30 carbon atoms inclusive selected from a 4-oxoheptanedioic acid compound,
   (2) a primary diamine compound of up to 30 carbon atoms wherein the amino groups are not located on adjacent carbon atoms, and
   (3) a tetracarboxylic acid compound having up to 30 carbon atoms wherein each of four separate carbon atoms is substituted with a carboxy group or part of an anhydride group, each of the four carbon atoms being adjacent to another carbon atom so substituted.

2. The process of claim 1 wherein the primary diamine compound is represented by the formula

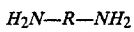

$$H_2N-R-NH_2$$

wherein R is an organic radical selected from aliphatic or aromatic of from 1 to 2 aromatic rings.

3. The process of claim 2 wherein tetracarboxylic acid compound is represented by the formula

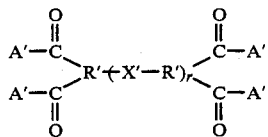

wherein A' is hydroxy or two A' groups together are oxy connecting carbonyl groups attached to adjacent carbon atoms, r is 0 or 1 and X' is R, X, haloalkylene, substituted-X wherein the substituents are halo or alkyl substituted on aromatic carbon atoms, di(carbonyl)X or di(carbonyloxyphenyl)X wherein X is a direct valence bond or X is alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene.

4. The process of claim 3 wherein the spirodilactam precursor is selected from a 4-oxoheptanedioic acid of the formula

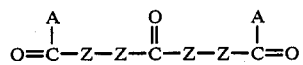

wherein A is hydroxy, alkoxy or halo, and Z independently is >C(Z')$_2$ in which Z' independently is hydrogen, lower alkyl, lower halogen or phenyl, of Z is such that two adjacent Z moieties taken together form a ring system Z'' of from 5 to 7 ring atoms inclusive, up to two of which are heteroatoms selected from nitrogen, oxygen or sulfur with the remainder of the ring atoms being carbon atoms, there being up to 15 carbon atoms in each Z'', two of which form a bridge between the central carbon atom and a carbon atom of a carboxy function.

5. The process of claim 4 wherein R of the diamine compound is divalent arylene which, when two rings are present, are connected by a direct valence bond, alkylene of up to 8 carbon atoms inclusive, oxy, thio, sulfonyl, carbonyl, dioxyphenylene, 2,2-di(oxyphenyl)propane, dioxyphenyl sulfone or dioxydiphenylene.

6. The process of claim 5 wherein, in the tetracarboxylic acid compound, r is 0 and R is aliphatic.

7. The process of claim 6 wherein the tetracarboxylic acid compound is 1,2,3,4-butanetetracarboxylic acid.

8. The process of claim 5 where, in the tetracarboxylic acid compound each R is aromatic.

9. The process of claim 8 wherein r is 0.

10. The process of claim 7 wherein the primary diamine compound is di(aminophenyl)methane.

11. The process of claim 10 wherein each Z is >C(Z')$_2$ and each A is hydroxy or alkoxy.

12. The process of claim 11 wherein the primary diamine is di(4-aminophenyl)methane.

13. The process of claim 5 wherein the tetracarboxylic acid is 1,2,3,4-butanetetracarboxylic acid.

14. The process of claim 13 wherein the primary diamine is di(4-aminophenyl)alkane.

15. The process of claim 13 wherein adjacent Z moieties are Z''.

16. The process of claim 15 wherein each Z'' is benzo.

17. The process of claim 16 wherein the primary diamine is di(4-aminophenyl)methane.

18. A linear alternating poly(amideimide) polymer wherein divalent moieties of up to 30 carbon atoms inclusive selected from aliphatic moieties or aromatic moieties of from 1 to 2 aromatic rings alternate randomly with moieties of a 1,6-diaza [4.4] spirodilactam of up to 30 carbon atoms and moieties of a bis(maleimide) of up to 30 carbon atoms.

19. The polymer of claim 18 having repeating units of the formula

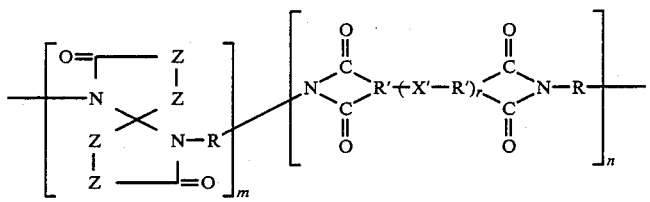

wherein Z independently is >C(Z')$_2$ in which Z' independently is hydrogen, lower alkyl, lower halo or phenyl, or Z is such that two adjacent Z groups taken together form a ring system Z" of from 5 to 7 ring atoms, up to two of which are heteroatoms selected from nitrogen, oxygen or sulfur atoms with the remainder of the ring atoms being carbon atoms, there being up to 15 carbon atoms in each Z", two of which connect the carbon atoms connected by the adjacent carbon atoms, R is aliphatic of up to 30 carbon atoms or aromatic of up to 30 carbon atoms and from 1 to 2 aromatic rings, which when two aromatic rings are present incorporates said rings as fused or connected by X, R' is R, r is 0 or 1, X' is R, X, haloalkylene, substituted-X wherein the substituents are alkyl or halo substituted on aromatic carbon atoms, di(carbonyl)X or di(carbonyloxyphenyl)X wherein X is a direct valence bond or X is alkylene of up to 8 carbon atoms, oxy, thio, sulfonyl, carbonyl, dioxyphenylene, 2,2-di(oxyphenyl)propane or dioxydiphenylene and the ratio of the randomly found polymer units as defined by m:n is from about 95:5 to about 5:95.

20. The polymer of claim 19 wherein R is divalent arylene which, when 2 aromatic rings are present are fused or connected by X.

21. The polymer of claim 19 or 20 wherein each Z is >C(Z')$_2$. is di(4-arylene)methane.

22. The polymer of claim 21 wherein each r is 0.

23. The polymer of claim 22 wherein R' is aromatic.

24. The polymer of claim 22 wherein R' is aliphatic.

25. The polymer of claim 24 wherein R' is a butane moiety.

26. The polymer of claim 25 wherein Z' is hydrogen.

27. The polymer of claim 26 wherein R is di(phenylene)alkane.

28. The polymer of claim 27 wherein the di(phenylene)alkane is di(4-phenylene)methane.

29. The polymer of claim 19 or 20 wherein adjacent Z groups are Z".

30. The polymer of claim 29 wherein each r is 0.

31. The polymer of claim 30 wherein Z" is benzo.

32. The polymer of claim 31 wherein R is di(4-phenylene)alkane.

33. The polymer of claim 32 wherein R' is aliphatic.

34. The polymer of claim 33 wherein R' is a butane moiety.

35. The polymer of claim 32 wherein R' is aromatic.

* * * * *